(12) United States Patent
Hamada et al.

(10) Patent No.: US 9,057,264 B2
(45) Date of Patent: Jun. 16, 2015

(54) SCREW SHAFT STRUCTURE FOR DOUBLE-SHAFT EXTRUDER

(75) Inventors: Takuya Hamada, Hiroshima (JP); Satoru Watada, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 80 days.

(21) Appl. No.: 13/991,234

(22) PCT Filed: Mar. 30, 2012

(86) PCT No.: PCT/JP2012/058530
§ 371 (c)(1),
(2), (4) Date: Jun. 3, 2013

(87) PCT Pub. No.: WO2012/133742
PCT Pub. Date: Oct. 4, 2012

(65) Prior Publication Data
US 2013/0251582 A1   Sep. 26, 2013

(30) Foreign Application Priority Data

Mar. 31, 2011   (JP) .................................. 2011-077325

(51) Int. Cl.
| | |
|---|---|
| *F01C 1/08* | (2006.01) |
| *F01C 1/24* | (2006.01) |
| *F03C 2/00* | (2006.01) |
| *F04C 2/36* | (2006.01) |
| *F01C 1/20* | (2006.01) |
| *B29C 47/08* | (2006.01) |
| *B29C 47/40* | (2006.01) |
| *B29C 47/00* | (2006.01) |
| *B29C 47/60* | (2006.01) |
| *B29B 7/48* | (2006.01) |

(52) U.S. Cl.
CPC . *F01C 1/082* (2013.01); *F04C 2/36* (2013.01); *F01C 1/20* (2013.01); *B29C 47/0805* (2013.01); *B29C 47/40* (2013.01); *B29C 47/0021* (2013.01); *B29C 47/6093* (2013.01); *B29B 7/489* (2013.01)

(58) Field of Classification Search
USPC .......... 418/191, 201.1, 205, 270; 366/89, 323
See application file for complete search history.

(56) References Cited

U.S. PATENT DOCUMENTS 3,143,767 A * 8/1964 Wirth et al. ...................... 366/89
3,496,603 A * 2/1970 Listner et al. ................. 425/151

(Continued)

FOREIGN PATENT DOCUMENTS

| CN | 2680444 | 2/2005 |
|---|---|---|
| DE | 10 2005 010 315 | 9/2006 |

(Continued)

OTHER PUBLICATIONS

Extended European Search Report issued Oct. 20, 2014 in corresponding European patent application No. 12 76 3032.
International Search Report issued May 22, 2012 in International Patent Application No. PCT/JP2012/058530.

(Continued)

*Primary Examiner* — Theresa Trieu
(74) *Attorney, Agent, or Firm* — Wenderoth, Lind & Ponack, L.L.P.

(57) ABSTRACT

A screw shaft structure for a twin screw extruder includes a tapered section (20) provided between a ground section (6) and a screw piece inserting section (8), and a tapered ring (21) fitted onto the tapered section (20). The tapered ring (21) serves as a flange section. An object is to reduce the weight of raw material to be used for manufacturing a screw shaft by combining a tapered section and a tapered ring as a structure of a flange section.

4 Claims, 5 Drawing Sheets

(56) References Cited

U.S. PATENT DOCUMENTS

| | | | | |
|---|---|---|---|---|
| 3,535,057 A | * | 10/1970 | Kodra | 418/201.1 |
| 3,672,641 A | * | 6/1972 | Slaby | 366/90 |
| 3,762,692 A | * | 10/1973 | Schippers | 366/89 |
| 4,202,633 A | | 5/1980 | Anders | |
| 4,423,960 A | * | 1/1984 | Anders | 366/89 |
| 4,527,899 A | | 7/1985 | Blach et al. | |
| 4,744,669 A | | 5/1988 | Kowalczyk et al. | |
| 5,655,298 A | * | 8/1997 | Haen et al. | 29/890.044 |
| 2008/0160157 A1 | * | 7/2008 | Rutishauser et al. | 426/601 |
| 2009/0213681 A1 | | 8/2009 | Ek et al. | |

FOREIGN PATENT DOCUMENTS

| | | | | |
|---|---|---|---|---|
| EP | 0 264 665 | | 4/1988 | |
| JP | 5-220815 | | 8/1993 | |
| JP | 8-1048 | | 1/1996 | |
| JP | 2877791 | | 3/1999 | |
| JP | 11216763 A | * | 8/1999 | B29C 47/40 |
| JP | 2005-22091 | | 1/2005 | |

OTHER PUBLICATIONS

Office Action issued Oct. 10, 2014 in corresponding Chinese patent application No. 201280004392.8 (with English translation).

* cited by examiner

SCREW SHAFT STRUCTURE FOR DOUBLE-SHAFT EXTRUDER

BACKGROUND OF THE INVENTION

1. Technical Field

The present invention relates to a screw shaft structure for a twin screw extruder, and more particularly, to a novel improvement for reducing a weight of a raw material, which is used for manufacturing a screw shaft, by combining a tapered section and a tapered ring as a structure of a flange section.

2. Description of the Related Art

As a conventionally used screw shaft structure for a twin screw extruder of this type, the structure disclosed in JP 2005-22091 may be taken as an example.

That is, the above-mentioned screw shaft structure of JP 2005-22091 is configured as illustrated in FIGS. 4 and 5.

Specifically, in FIG. 5, reference symbol 1 represents a screw shaft raw material to be used for manufacturing a screw shaft 2 through a cutting process. The screw shaft raw material 1 has a pair of suspension holes 3 and 4 provided at both ends thereof, and the screw shaft raw material 1 can be transported through the suspension holes 3 and 4.

From the screw shaft raw material 1, a connection section 5 to be connected to a gear reducer of a drive motor (not shown), a ground section 6 formed integrally with the connection section 5, a flange section 7 formed on a downstream side of the ground section 6, and a screw piece inserting section 8 connected to the flange section 7 and to be used for insertion of a plurality of screw segments are formed through the cutting process.

Note that, as illustrated in FIG. 4, two screw shafts 2 are provided in parallel inside a cylinder (not shown) and formed as the twin screw extruder described above.

SUMMARY OF THE INVENTION

1. Technical Problems

The conventional screw shaft structure for a twin screw extruder is formed as described above, and hence the following problems are inherent therein.

Specifically, the conventional screw shaft 2 includes the flange section 7 that is integrally formed between the ground section 6 and the screw piece inserting section 8, and hence an outer diameter of the flange section 7 is the largest outer diameter of the screw shaft 2.

In contrast, apart having the smallest outer diameter is the screw piece inserting section 8 to be used for insertion of a plurality of screw segments. The screw piece inserting section 8 occupies the largest axial length.

Therefore, as illustrated in FIG. 5, the screw shaft 2 is manufactured through the cutting process from the screw shaft raw material 1 that is formed of an elongated columnar body, and hence an outer diameter of the screw shaft raw material 1 needs to be set equal to or larger than the outer diameter of the flange section 7. When the screw shaft 2 is manufactured from the screw shaft raw material 1 in this state, a large amount of unnecessary portions are generated particularly from the part corresponding to the screw piece inserting section 8 that is smaller in diameter than the flange section 7. Accordingly, such structure is wasteful in terms of cost and raw material, resulting in an increase in weight of the blank relative to a weight of the screw shaft 2 as a final product.

2. Solution to the Problems

According to the present invention, there is provided a screw shaft structure for a twin screw extruder, including at least: a connection section to be connected to a gear reducer; a ground section; and a screw piece inserting section. The screw shaft structure for a twin screw extruder further includes: a tapered section provided between the ground section and the screw piece inserting section; and a tapered ring fitted onto the tapered section, the tapered ring serving as a flange section.

Further, an outer diameter of the tapered section is set equal to or smaller than a ground section outer diameter of the ground section.

3. Advantageous Effects of the Invention

The screw shaft structure for a twin screw extruder according to the present invention is configured as described above, and hence the following effects can be obtained.

Specifically, the screw shaft structure for a twin screw extruder includes at least the connection section to be connected to a gear reducer, the ground section, and the screw piece inserting section. The tapered section is provided between the ground section and the screw piece inserting section, and the tapered ring is fitted onto the tapered section to serve as a flange section. Accordingly, it is only the tapered section that is manufactured from the screw shaft blank at a position between the ground section and the screw piece inserting section. Thus, the outer diameter is reduced as compared to the conventional flange section so that the outer diameter of the screw shaft raw material can be reduced and the weight and shape of the screw shaft raw material can also be reduced. Further, the cost of the raw material and the period of time required for the processing are reduced so that the cost for the processing can be reduced.

Further, as compared actually to the conventional structure, the effect of reducing the weight of the blank is 30%, and the effect of reducing the period of time required for the mechanical processing is 20%.

Thus, the cost reduction including the cost for the raw material and processing is about 40%.

Further, the outer diameter of the tapered section is set equal to or smaller than the ground section outer diameter of the ground section. Accordingly, the largest outer diameter is only the outer diameter of the ground section over the entire length of the screw shaft manufactured from the screw shaft blank. Thus, as compared to the conventional screw shaft, the outer diameter of the screw shaft blank can be reduced, and the cost for the material of the screw shaft raw material can be reduced.

DETAILED DESCRIPTION OF THE INVENTION

The present invention has an object to provide a screw shaft structure for a twin screw extruder, which is capable of reducing a weight of a raw material to be used for manufacturing a screw shaft by combining a tapered section and a tapered ring as a structure of the flange section.

In the following, a screw shaft structure for a twin screw extruder according to an exemplary embodiment of the present invention is described with reference to the drawings.

Note that, the same components as those of the conventional example or components corresponding thereto are represented by the same reference symbols.

Figure 3:
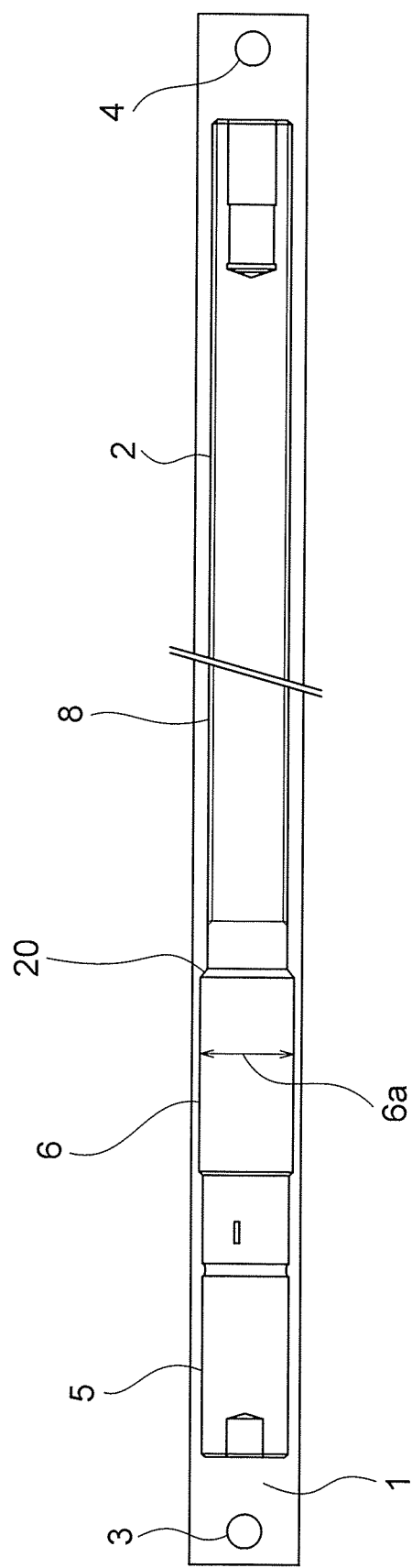
FIG. 3 is an explanatory view illustrating a screw shaft raw material in a state in which a single screw shaft of FIG. 1 is subjected to a cutting process.
Figure 4:
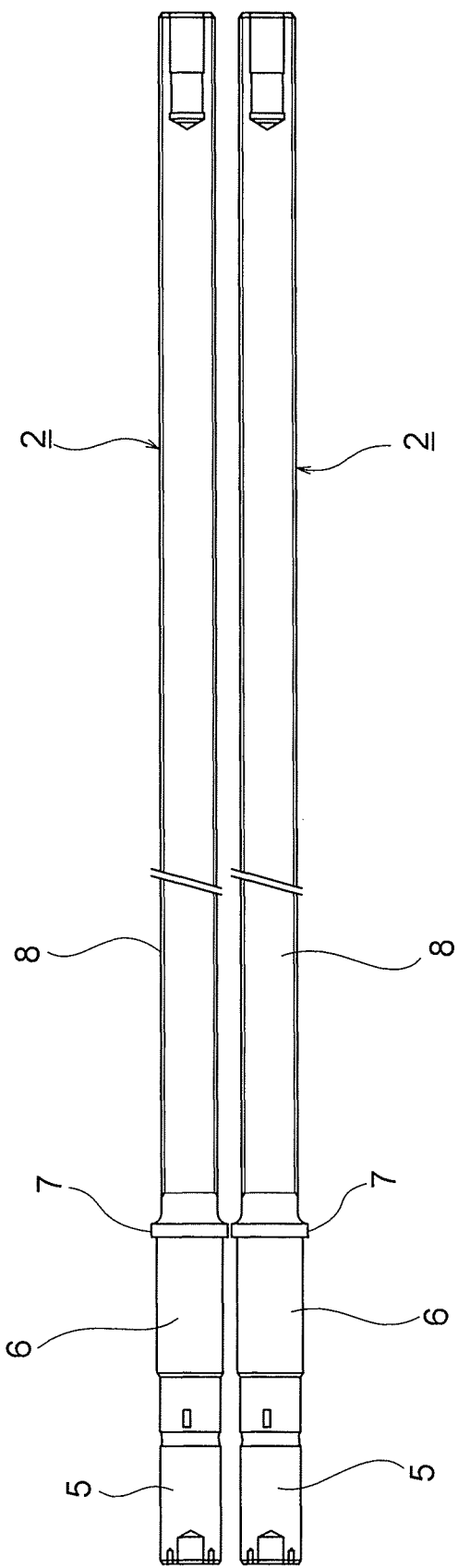
FIG. 4 is a sectional plan view illustrating a conventional screw shaft structure for a twin screw extruder.
Figure 5:
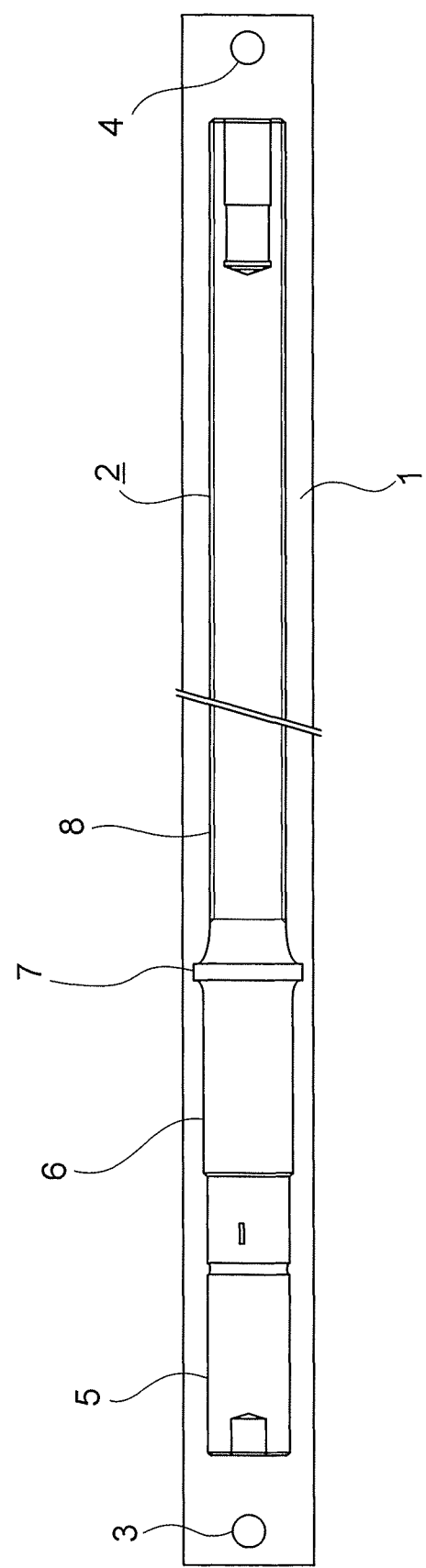
FIG. 5 is an explanatory view illustrating a screw shaft raw material in a state in which a screw shaft of FIG. 5 is subjected to the cutting process.

In FIG. 3, reference symbol 1 represents a screw shaft raw material to be used for manufacturing a screw shaft 2 through a cutting process. The screw shaft raw material 1 has a pair of suspension holes 3 and 4 provided at both ends thereof, and the screw shaft raw material 1 can be transported through the suspension holes 3 and 4.

From the screw shaft raw material, a connection section 5 to be connected to a gear reducer (30) of a drive motor, a ground section 6 formed integrally with the connection section 5, and a tapered section 20 formed on a downstream side of the ground section 6 at a position between the ground section 6 and a screw piece inserting section 8 are formed through the cutting process. Note that, the tapered section 20 is illustrated in the region A of FIG. 1, and is illustrated in FIG. 2 in an enlarged manner.

An outer diameter of the tapered section 20 thus formed is set equal to or smaller than a ground section outer diameter 6a of the ground section 6.

As described above, the outer diameter of the tapered section 20 is set equal to or smaller than the ground section outer diameter 6a, and hence apart of the screw shaft 2 having the largest outer diameter is the part having the ground section outer diameter 6a. As a result, an outer diameter of the screw shaft raw material 1 can be reduced more greatly as compared to the outer diameter of the conventional screw shaft raw material 1, and the weight thereof can also be reduced greatly.

Figure 1:
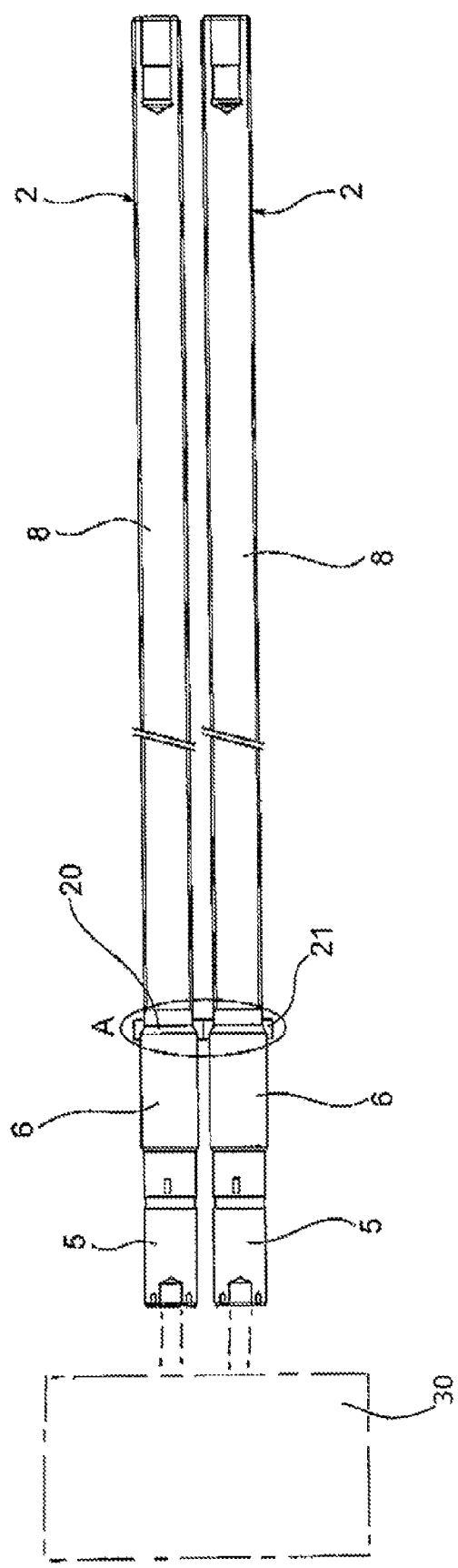
FIG. 1 is a sectional plan view illustrating a screw shaft structure for a twin screw extruder according to the present invention.
Figure 2:
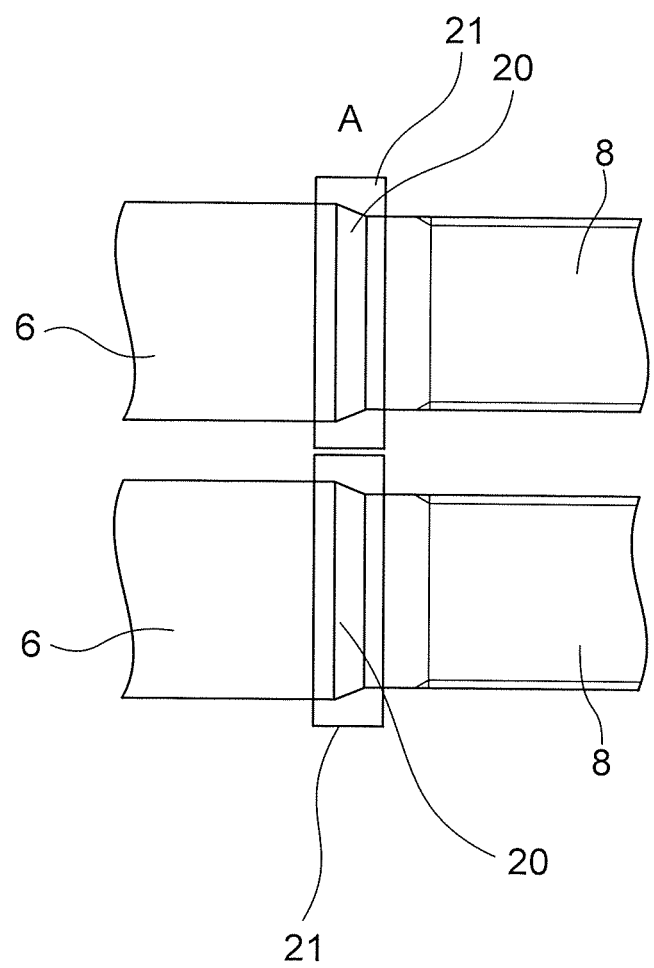
FIG. 2 is an enlarged view of the region A of FIG. 1.

Further, as illustrated in FIGS. 1 and 2, a tapered ring 21 having an inner surface shape conforming to an outer surface shape of the tapered section 20 is fitted onto an outer periphery of the tapered section 20, and screw segments (not shown) to be inserted onto the screw piece inserting section 8 are positioned and fixed by the tapered ring 21 so that an action corresponding to that of the conventional flange section 7 can be obtained. Note that, the tapered section 20 serves as a part on which the tapered ring 21 is fitted, and hence stress concentration is avoided and damage and the like can be prevented.

Thus, the largest outer diameter of the screw shaft 2 is the ground section outer diameter 6a of the ground section 6, and hence, by setting the outer diameter of the screw shaft raw material 1 to be equal to the ground section outer diameter 6a, the screw shaft raw material 1 can be reduced greatly.

The screw shaft structure for a twin screw extruder according to the present invention is formed of the tapered section and the tapered ring which serve as the conventional flange section. Accordingly, the outer diameter of the screw shaft raw material can be reduced greatly, and the cost required therefore can be reduced greatly.

The invention claimed is:

1. A screw shaft structure for a twin screw extruder, comprising at least:
   a connection section to be connected to a gear reducer;
   a ground section; and
   a screw piece inserting section,
   the screw shaft structure for a twin screw extruder further comprising:
   a tapered section provided between the ground section and the screw piece inserting section; and
   a tapered ring fitted onto the tapered section, the tapered ring serving as a flange section.

2. A screw shaft structure for a twin screw extruder according to claim 1, wherein an outer diameter of the tapered section is set equal to or smaller than a ground section outer diameter of the ground section.

3. A screw shaft structure for a twin screw extruder according to claim 1, wherein the tapered ring has an inner surface shape that conforms to an outer surface shape of the tapered section.

4. A screw shaft structure for a twin screw extruder according to claim 3, wherein the tapered ring is fixed to the outer surface of the tapered section.

* * * * *